_(12)_ United States Patent
Paul (10) Patent No.: US 11,404,059 B1
(45) Date of Patent: Aug. 2, 2022

(54) SYSTEMS AND METHODS FOR AUTOMATICALLY GENERATING DIGITAL RESPONSE-INDICATORS BASED ON AUDIO INPUTS

(71) Applicant: Meta Platforms, Inc., Menlo Park, CA (US)

(72) Inventor: Debashish Paul, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 252 days.

(21) Appl. No.: 16/656,951

(22) Filed: Oct. 18, 2019

(51) Int. Cl.
*G10L 15/22* (2006.01)
*G06F 3/16* (2006.01)
*G10L 15/18* (2013.01)
*G10L 15/08* (2006.01)

(52) U.S. Cl.
CPC .............. *G10L 15/22* (2013.01); *G06F 3/167* (2013.01); *G10L 15/083* (2013.01); *G10L 15/1822* (2013.01); *G10L 2015/088* (2013.01); *G10L 2015/223* (2013.01)

(58) Field of Classification Search
CPC ......... G10L 15/22; G10L 15/00; G10L 15/01; G10L 15/04; G10L 15/06; G10L 15/08; G10L 15/18; G10L 15/1807; G10L 15/183; G10L 15/24; G10L 15/26; G10L 2015/0631–0638; G10L 2015/221–228
USPC .... 704/270.1, 270, 272, 274, 275, 231, 233, 704/245, 246, 249, 250
See application file for complete search history.

(56) References Cited

U.S. PATENT DOCUMENTS

| | | | |
|---|---|---|---|
| 2010/0251386 A1* | 9/2010 | Gilzean | G06F 21/10 726/28 |
| 2018/0013799 A1* | 1/2018 | Davies | H04L 65/1089 |
| 2018/0204574 A1* | 7/2018 | Hart | G10L 15/20 |
| 2019/0205469 A1* | 7/2019 | Cunico | G06F 16/637 |

* cited by examiner

*Primary Examiner* — Qi Han
(74) *Attorney, Agent, or Firm* — FisherBroyles, LLP (57) ABSTRACT

Systems and methods for screenless computerized social-media access may include (1) receiving, from a user device, data describing an audible user response to a segment of an audiobook that was transmitted to the user device from an audiobook service, (2) creating a digital response-indicator indicative of the audible user response, and (3) providing the digital response-indicator to an additional user device. Various other methods, systems, and computer-readable media are also disclosed.

20 Claims, 6 Drawing Sheets

SYSTEMS AND METHODS FOR AUTOMATICALLY GENERATING DIGITAL RESPONSE-INDICATORS BASED ON AUDIO INPUTS

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Digital audiobook services provide end users with a seemingly endless supply of literature. Many modern audiobook services are cloud-based, providing content to user devices via streaming and/or download. However, the amount of user response data collected as users consume such content is currently limited. The present disclosure identifies a need for improved systems and methods for collecting response data from end users as they consume audiobook content and subsequently providing enhanced digital audiobook content that incorporates the collected response data.

As will be described in greater detail below, embodiments of the present disclosure may provide a digital audiobook system. In some examples, the audiobook system may collect data describing audible user responses to an audiobook. In some examples, the audible user responses may represent spontaneous responses (e.g., laughter and/or words and/or phrases exclaimed by users as they listen to the audiobook). Additionally or alternatively, the audible user responses may represent vocal commands (e.g., an instruction to highlight a segment of the audiobook, bookmark a segment of the audiobook, listen or re-listen to a segment of the audiobook, add a comment to a segment of the audiobook, etc.).

After collecting the data, the disclosed audiobook system may digitally enhance the audiobook based on the data and may provide the enhanced audiobook to future listeners of the audiobook. The audiobook system may enhance the audiobook in a variety of ways. In some examples, the audiobook system may superimpose a sound effect over a segment of the audiobook. For example, the audiobook system may superimpose a soundtrack of people laughing over a segment which generated laughter from previous listeners of the segment. Additionally or alternatively, the audiobook system may organize various segments of the audiobook based on the collected responses. For example, the audiobook system may delineate segments that are most often highlighted, laughed at, and/or re-listened to and may enable future listeners to search and select segments based on these delineations.

In some embodiments, the audiobook system may enhance the audiobook by superimposing visual indicators over segments of a digitally printed version of the audiobook, which may then be provided to a reader via a display element of a computing device. In one example, an author of an audiobook may be provided with an author interface that summarizes users' responses to the audiobook and/or facilitates digital interactions between readers of the audiobook and the author.

As will be explained in greater detail below, embodiments of the present disclosure may improve an audiobook system by enhancing content provided by the audiobook system and/or improving an organization of content provided by the audiobook system. The present disclosure may improve the functioning of a computer itself by improving the computer's data organization and data retrieval for audiobook content.

Figure 1:
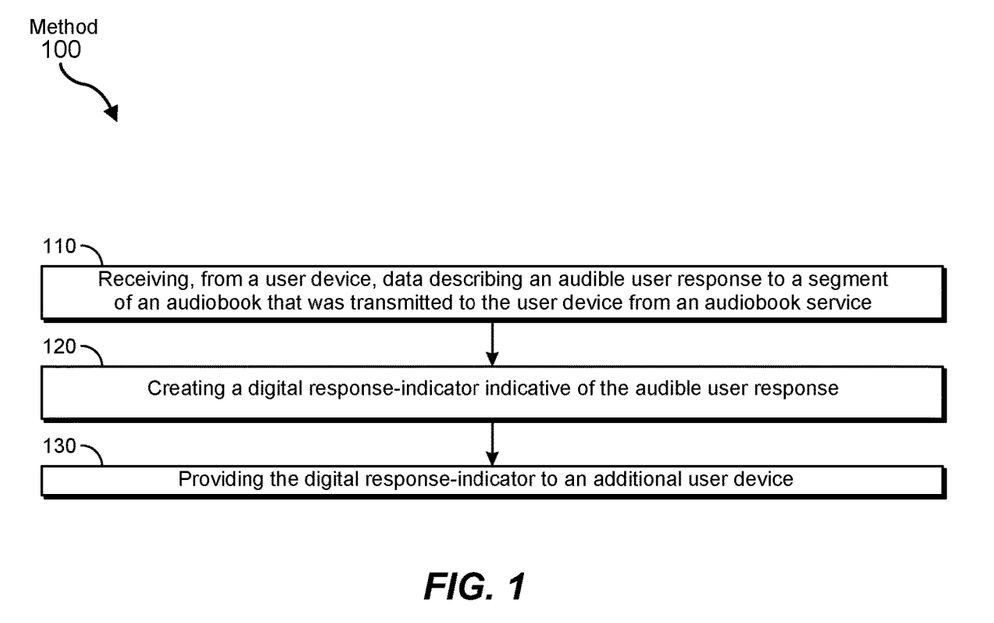
FIG. 1 is a flow diagram of an exemplary method for digitally collecting audible responses to audiobook content and creating digital response-indicators based on the collected responses.

The following will provide, with reference to FIG. 1, detailed descriptions of computer-implemented methods for digitally collecting audible responses to audiobook content and digitally enhancing the content based on the collected responses. Detailed descriptions of corresponding example systems will also be provided in connection with FIG. 2. Additionally, detailed descriptions of exemplary social-media interfaces will be provided in connection with FIGS. 3-4. Finally, detailed descriptions of an exemplary audiobook environment will be provided in connection with FIGS. 5.

FIG. 1 is a flow diagram of an exemplary computer-implemented method 100 for digitally collecting audible responses to audiobook content and digitally enhancing the content based on the collected responses. The steps shown in FIG. 1 may be performed by any suitable computer-executable code and/or computing system, such as the systems described herein. In one embodiment, the steps shown in FIG. 1 may be performed by modules operating within a computing device. For example, the steps shown in FIG. 1 may be performed by modules operating in a server 202 and/or modules operating in a user device 204 (e.g., as shown in exemplary system 200 in FIG. 2).

Server 202 generally represents any type or form of backend computing device that may perform one or more functions directed at providing an audiobook system to end users. In some examples, server 202 may operate in connection with a social-media platform 206 that provides an audiobook system to its end users. Although illustrated as a single entity in FIG. 2, server 202 may include and/or represent a group of multiple servers that operate in conjunction with one another.

Figure 2:
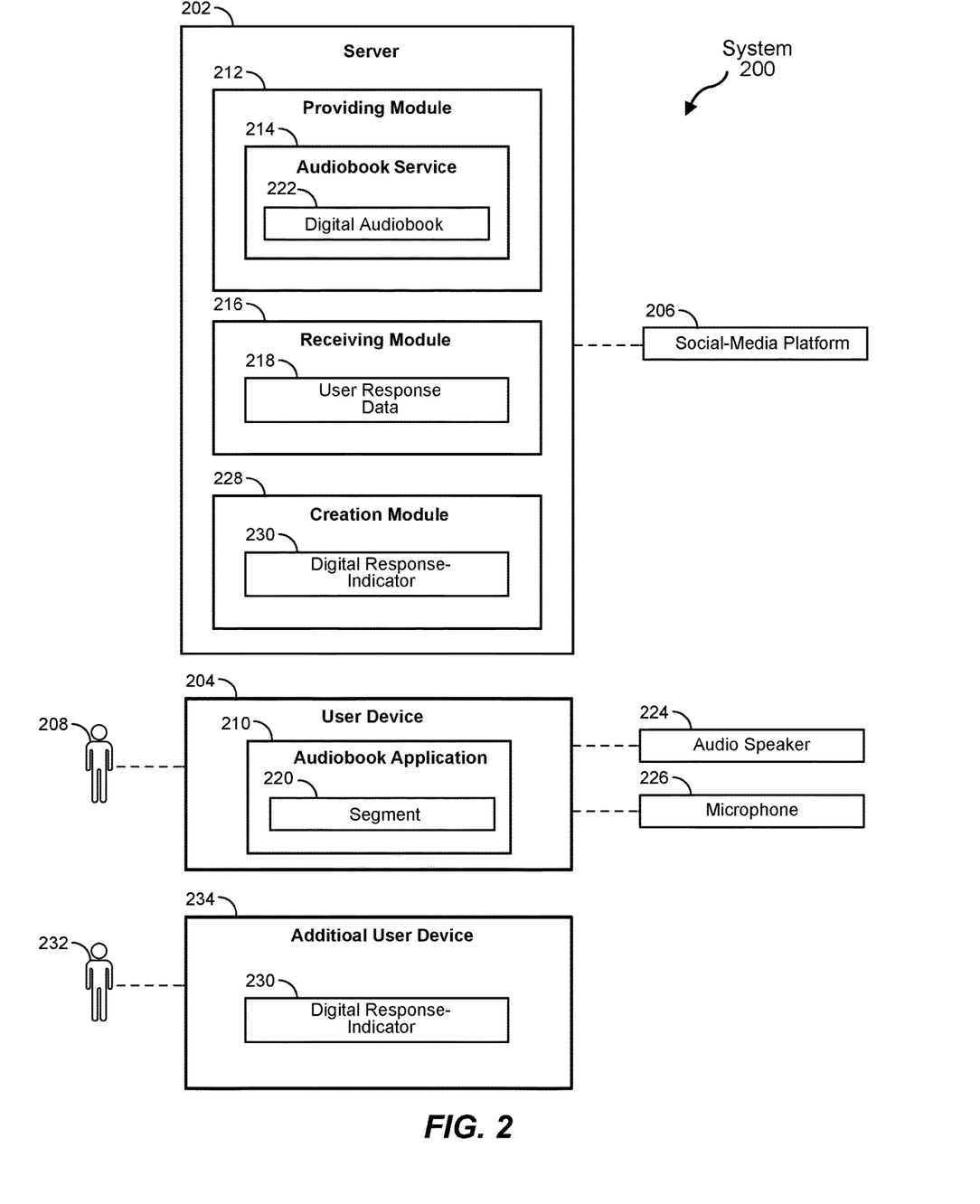
FIG. 2 is a block diagram of an exemplary system for digitally collecting audible responses to audiobook content and creating digital response-indicators based on the collected responses.

User device 204 generally represents any type or form of computing device capable of reading computer-executable instructions. For example, user device 204 may represent a smart phone and/or a tablet. Additional examples of user device 204 may include, without limitation, a laptop, a desktop, a wearable device, a personal digital assistant (PDA), etc.

In some examples, user device 204 may have an audiobook application 210 installed, through which one or more audiobook services provided by server 202 may be accessible. In examples in which server 202 operates as part of social-media platform 206, audiobook application 210 may represent a social-media application that provides, as part of its services, an audiobook service. Additionally or alternatively, user device 204 may have a browser installed that may navigate to one or more webpages maintained by server 202, through which one or more audiobook services provided by server 202 may also be accessible.

Figure 3:
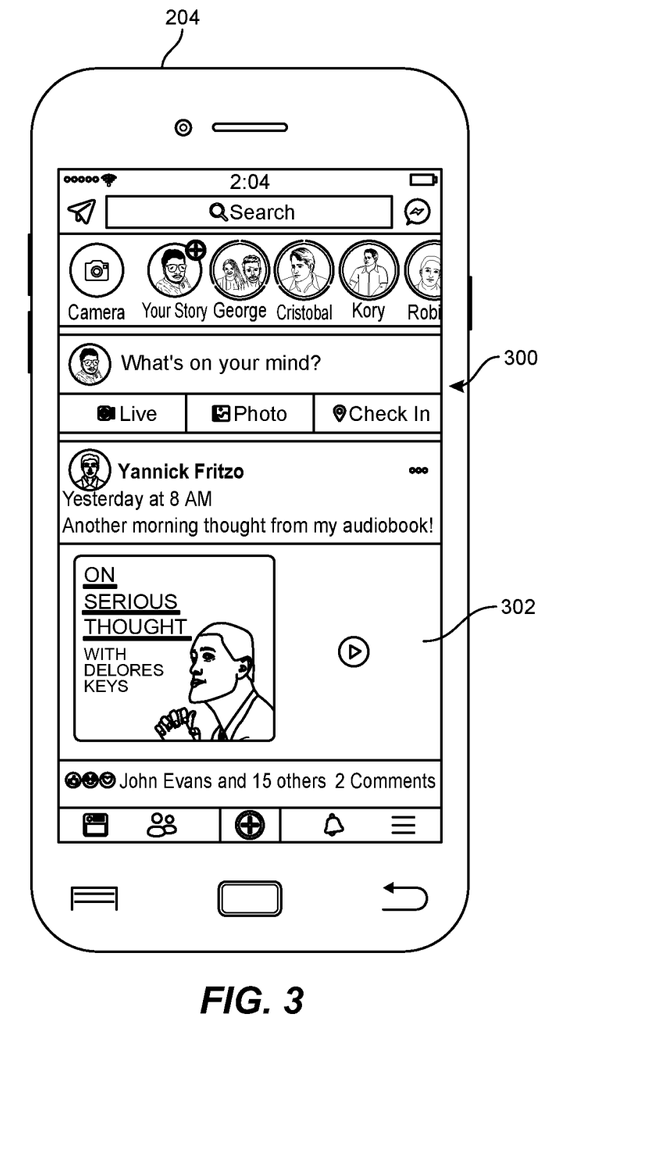
FIG. 3 is an illustration of an exemplary newsfeed interface with a post that includes an audiobook segment.

Social-media platform 206 may provide a variety of services for the users within its network (e.g., user 208). In one example, social-media platform 206 may provide a newsfeed service. The term "newsfeed" may generally refer to any type or form of social-media consumption channel that presents a scrollable collection of newsfeed posts. In some examples, a newsfeed may scroll (e.g., upward or downward) to reveal different posts within the newsfeed, in response to receiving user scrolling input. In one example, the scrollable collection may include a collection of newsfeed posts created by contacts of a particular user (e.g., friends of the particular user). The term "newsfeed post" as used herein generally refers to any type or form of digital composition that may be displayed in a newsfeed. Newsfeed posts may include, without limitation, text-based compositions, media-based compositions (which may include either a single media item or a collage of multiple media items and/or combination of different types of media items), and/or a link to an online article. FIG. 3 provides an illustration of an exemplary newsfeed interface 300.

Figure 4:
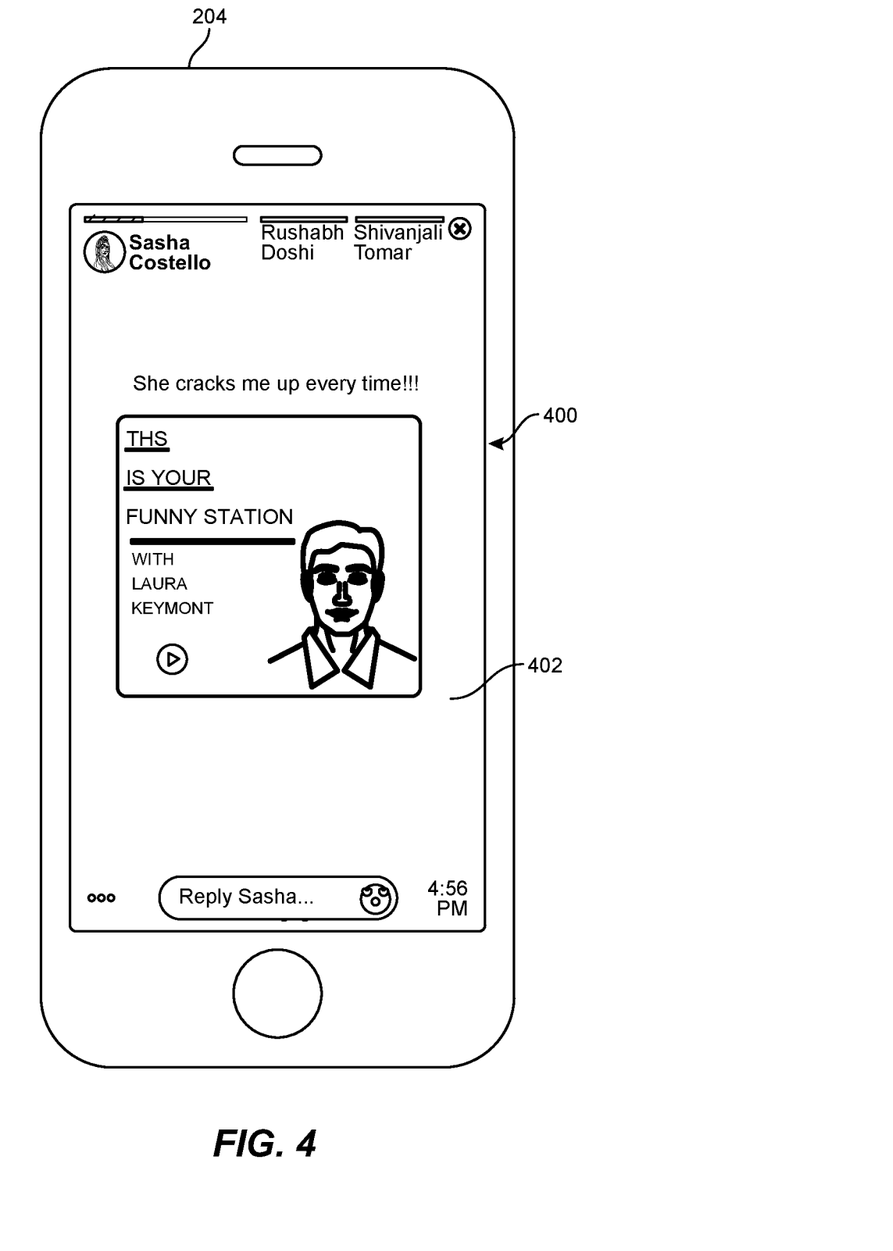
FIG. 4 is an illustration of an exemplary digital story interface with a post that includes an audiobook segment.

As another example, social-media platform 206 may provide a digital story service. The digital story service may provide users with a story consumption channel, which presents a continuous series of digital story posts to a story-consumer, one by one. In one example, the story consumption channel may transition from presenting one digital story post to the next automatically, without requiring any user input to do so. In some examples, a digital story post may only be viewable for a predetermined amount of time. For example, a digital story composition may be set to disappear after twenty-four hours. The term "digital story post" may generally refer to any type or form of social-media post intended for a story consumption channel. A digital story composition may include a variety of content (e.g., a digital photograph, a graphic, text, a digital video and/or a digital recording of a music composition). In some examples, digital story posts from a same source (e.g., created and/or posted by a same user) may be grouped together within the story consumption channel, such that each digital story post from a particular source is displayed prior to displaying digital story posts from another source. FIG. 4 provides an illustration of an exemplary digital story interface 400.

As another example, social-media platform 206 may provide a messaging service. The term "messaging service" may generally refer to any type or form of digital message delivery system that enables users of social-media platform 206 to exchange messages (e.g., private messages between two or more users). These messages may include a variety of content (e.g., a text, link, live video, voice recordings, etc.) and may take a variety of forms (e.g., e-mail, text message, group chat, etc.).

In some examples, social-media platform 206 may additionally provide (e.g., via a providing module 212) an audiobook service 214. In these examples, as will be described in greater detail below in connection with step 110-130, audiobook service 214 may digitally provide audio content in a way that improves digital social connection.

Returning to FIG. 1, at step 110, one or more of the systems described herein may receive, from a user device, data describing an audible user response to a segment of an audiobook that was transmitted to the user device from an audiobook service. For example, as illustrated in FIG. 2, a receiving module 216 may receive, from user device 204, user response data 218 describing an audible user response, from user 208, to a segment 220 of a digital audiobook 222 that was transmitted to user device 204 from audiobook service 214.

Audiobook service 214 generally represents any type or form of digital service that enables users, such as user 208, to digitally consume and/or share audiobooks via user devices, such as user device 204. In one example, audiobook service 214 may maintain a cloud-based database of digital audiobooks, from which users may select an audiobook for consumption. In some embodiments, audiobook service 214 may provide an audiobook-selection interface from which audiobooks may be selected. Once selected, audiobook service 214 may provide audiobooks via streaming and/or download.

In some examples, audiobook service 214 may be provided via audiobook application 210. Additionally or alternatively, audiobook service 214 may be provided via a browser installed on user device 204. In certain embodiments, as discussed briefly above, audiobook service 214 may operate as part of social-media platform 206. In these embodiments, social-media platform 206 may provide audiobook service 214 via an application (e.g., audiobook application 210) and/or a browser maintained by social-media platform 206.

In embodiments in which audiobook service 214 operates as part of social-media platform 206, social-media platform 206 may enable user 208 to share audiobook content consumed by user 208 with other users via social-media platform 206. For example, social-media platform 206 may enable user 208 to share a segment of an audiobook via a newsfeed post and/or a digital story post. FIG. 3 provides a specific example of a newsfeed post 302 in which audiobook content is shared via the newsfeed post. FIG. 4 provides a specific example of a digital story 402 in which audiobook content is shared via a digital story.

Digital audiobook 222 may generally represent any type or form of audio file (e.g., formatted to be accessed via an MP3 player and/or an e-reader) that includes a voice recording of written material (e.g., a book, play, and/or monologue). In some examples, digital audiobook 222 may include a voice recording of human speech. Additionally or alternatively, digital audiobook 222 may include synthesized computer-generated speech. Digital audiobook 222 may have been provided to user device 204, (e.g., by providing module 212) in a variety of ways. For example, digital audiobook 222 may be provided via online streaming to audiobook application 210 and/or a browser and/or may be downloaded to user device 204 to audiobook application 210 and/or to a downloads folder.

Prior to receiving module 216 receiving user response data 218, user device 204 may collect user response data 218. User device 204 may collect user response data 218 in a variety of ways. In some examples, user device 204 may (e.g., via an audiobook module operating as part of audiobook application 210) (1) play segment 220 via an audio speaker 224 communicatively coupled to user device 204 and (2) detect, via a microphone 226 communicatively coupled to user device 204, an audible user response, described within user response data 218, as segment 220 is playing.

Figure 5:
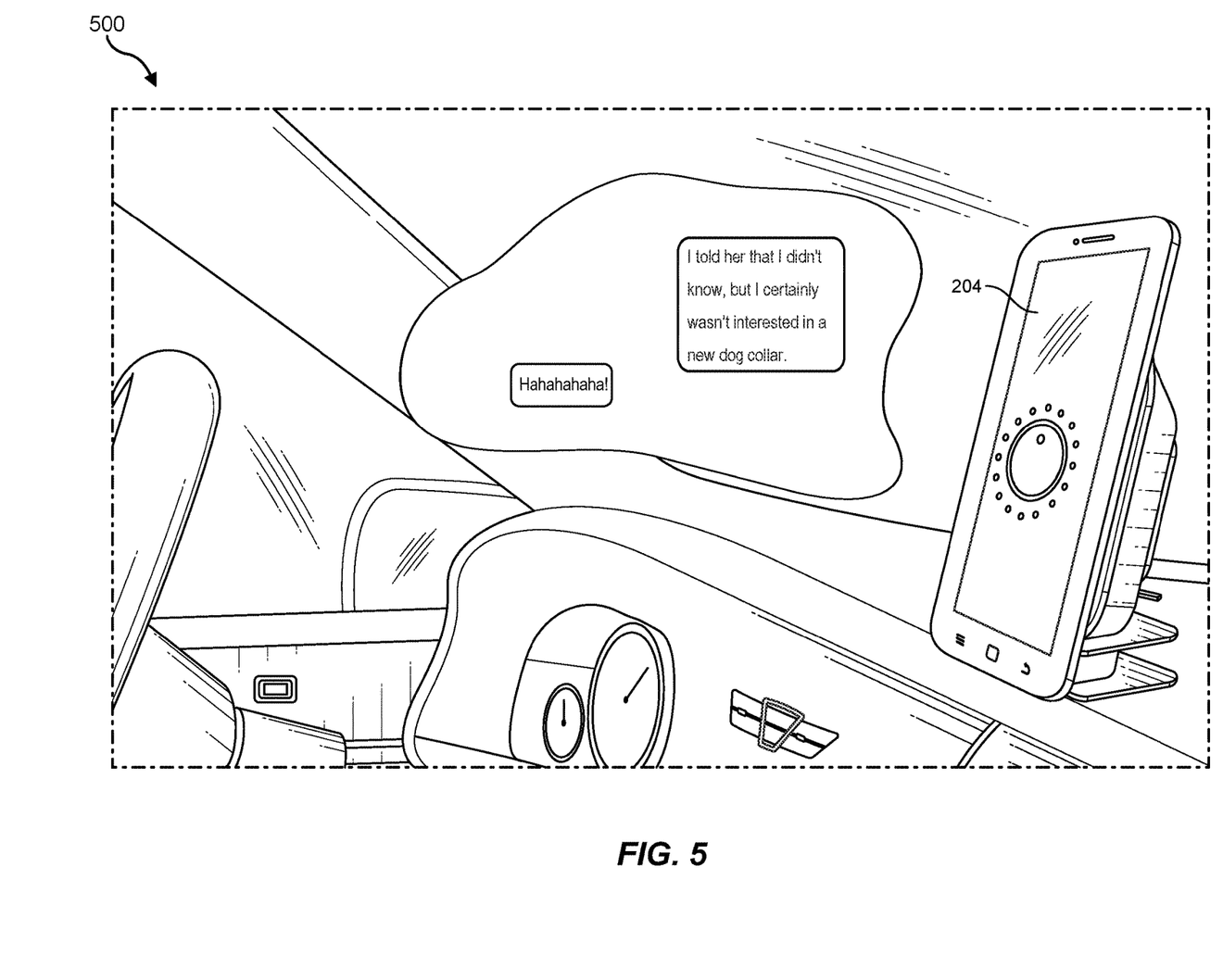
FIG. 5 is a depiction of an exemplary audiobook environment.

Audio speaker 224 may represent any type or form of output hardware device that converts electrical signals into sounds. In some examples, audio speaker 224 may be embedded directly within user device 204. In other examples, audio speaker 224 may represent an external device and/or may be embedded within an external device that is communicatively coupled to user device 204. In these examples, audio speaker 224 may be communicatively coupled via a wireless connection (e.g., via Bluetooth) and/or a wired connection (e.g., via a cable). FIG. 5 illustrates a specific example in which audio speaker 224 represents a car speaker communicatively coupled to user device 204. In other examples in which audio speaker 224 operates as part of an external device, audio speaker 224 may represent a smart speaker and/or a set of headphones.

Microphone 226 may represent any type or form of hardware device that converts sound waves into electrical signals. Microphone 226 may be directly embedded within user device 204 and/or may represent and/or may be embedded within an external device that is communicatively coupled to user device 204 via a wired or wireless connection.

User device 204 may collect user 208's audible responses in response to a variety of triggers. In some examples, user device 204 may collect the audible responses automatically, whenever an audiobook from audiobook service 214 is playing. Additionally or alternatively, user device 204 may detect an audible response in response to receiving user input requesting the detection of an audible response.

Once user response data is collected, user device 204 may be configured to transmit user response data to server 202 automatically (e.g., as the user response data is collected, each time an audiobook listening session is ended, after a certain amount of data is collected, and/or at predetermined time intervals). Alternatively, user device 204 may be configured to transmit user response data to server 202 in response to receiving user input and/or a request from server 202 instructing the same.

User response data 218 may describe a variety of audible user responses. In some examples, the audible user response may represent a spontaneous user response, such as laughter, an exclamation, a gasp, and/or one or more words. FIG. 5 illustrates an exemplary environment 500 in which an exemplary embodiment of segment 220 ("I told her that I didn't know, but I certainly wasn't interested in a new dog collar") is played by an audio speaker communicatively coupled to user device 204 and a spontaneous user response (laughter) is detected from user 208 via a microphone communicatively coupled to user device 204. In this specific example, receiving module 216 may receive user response data indicating that the user 208 laughed while segment 220 was played.

In some examples, the audible user response may represent a vocal command. For example, the audible user response may represent an instruction to highlight segment 220 and/or bookmark segment 220. In some embodiments, the audible user response may represent an instruction to assign an attribute to segment 220. In these embodiments, the instruction may assign a variety of attributes to segment 220 (e.g., liked, beautiful, inspirational, testable, scary, adult, important, boring, interesting, etc.). In some examples, the vocal command may represent an established (i.e., pre-programmed) command. In other examples, user device 204 may (e.g., via the audiobook module) (1) detect a vocal utterance and (2) determine, using machine learning, (i) that the vocal utterance is a command and (ii) a substance of the command.

Receiving module 216 may perform the functions described herein in connection with a variety of privacy policies, which limit data access to user data that users have opted-in to providing. In some examples, receiving module 216 may provide a user permissions interface through which user 208 may provide express permission for audiobook service 214 and/or social-media platform 206 to collect user response data such as user response data 218.

In certain embodiments, the express permission may permit ongoing gathering of user response data. In other embodiments, the express permission may be required each time user response data is collected and/or transmitted, before user device 204 is permitted to collect the data and/or before server 202 is permitted to access the data. In some embodiments, the user permissions interface may enable the user to (1) deny access to user response data, (2) permit access to user response data but only allow the data to be used to create enhanced audiobook features for the user, and/or (3) permit access to user response data and allow the data to be used to create enhanced audiobook features for the user and additional users.

Returning to FIG. 1, at step 120, one or more of the systems described herein may create a digital response-indicator indicative of the audible user response. For example, creation module 228 may create a digital response-indicator 230 indicative of the audible user response described in user response data 218.

Digital response-indicator may take a variety of forms, depending on the type of audible user response received from user device 204. In some examples, digital response-indicator 230 may represent a digital sound effect. For example, digital response-indicator 230 may represent a soundtrack of people laughing. In these examples, creation module 228 may superimpose digital response-indicator 230 over a portion of digital audiobook 222 (e.g., over a segment of an audio file) corresponding to segment 220.

As a specific example, creation module 228 may superimpose a soundtrack of people laughing over segment 220, in embodiments in which user response data 218 indicates that user 208 laughed while segment 220 was playing. As another specific example, creation module 228 may superimpose a verbal warning (e.g., "The following may represent adult content" and/or "Others listeners have indicated that the following information is highly testable") immediately before segment 220, in embodiments in which user response data 218 indicates that user 208 designated segment 220 with an attribute for which a verbal warning may be appropriate.

Additionally or alternatively, digital response-indicator 230 may represent text (e.g., text within a comments box) and/or a visual graphic, such as a highlight, a digital image (e.g., an image of a heart and/or an exclamation mark), an animation, an emoji, etc. In these examples, creation module 228 may digitally position digital response-indicator 230 within a digitally printed version of digital audiobook 222, in a manner that visually connects digital response-indicator 230 with segment 220. For example, creation module 228 may digitally position digital response-indicator 230 over the top of segment 220, beside segment 220 (e.g., in a digital margin), below segment 220, and/or above segment 220.

Figure 6:
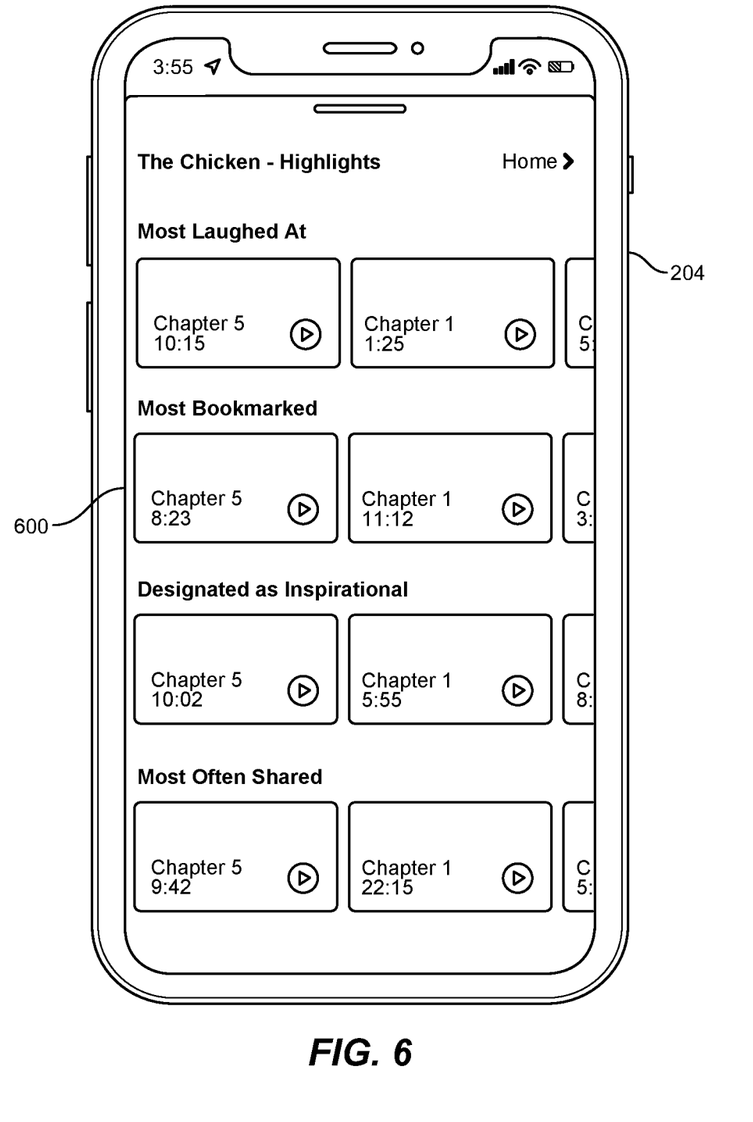
FIG. 6 is a depiction of an exemplary audiobook highlights table.

In some embodiments, digital response-indicator 230 may represent an entry in a table summarizing user responses to segments of digital audiobook 222. In these embodiments, creation module 228 may create a table that categorizes segments of digital audiobook 222. For example, the table may include an entry of segments of digital audiobook 222 that were laughed at, expressly categorized by users (e.g., as insightful, boring, redundant, interesting, etc.), most highlighted, most listened to, etc. FIG. 6 provides an illustration of an interface 600 with an exemplary table that may be provided to access categorized segments of a digital audiobook.

Creation module 228 may create digital response-indicator 230 in a variety of ways. In some examples, creation module 228 may rely on a policy that delineates digital response-indicators to be selected for various specified audible responses (e.g., a policy to select a soundtrack of people laughing in response to receiving user response data indicative of laughter). In other examples, creation module 228 may rely on a machine learning classifier. In these examples, the machine learning classifier may have been trained on a variety of training data (e.g., data indicating (1) spontaneous audible responses detected from users listening to a particular segment of an audiobook and (2) subsequent digital response-indicators subsequently selected and/or approved for the particular segment).

In some examples, creation module 228 may create digital response-indicator 230 based on user response data received from a single user device (i.e., user response data 218 received from user device 204). In other examples, creation module 228 may create digital response-indicator 230 based on aggregated data from multiple user devices, including user response data 218 received from user device 204. In these examples, creation module 228 may rely on any type or form of rule set to determine an appropriate digital response-indicator based on the aggregated data (e.g., a policy to select a digital response-indicator that corresponds to a threshold percentage and/or number of audible user responses described in the aggregated data, a policy to select a predetermined number of digital response-indicators for a particular segment based on most common audible user responses, and/or a policy to select a digital response-indicator for each audible user response detected).

Finally, returning to FIG. 1, at step 130, one or more of the systems described herein may provide the digital response-indicator to an additional user device. For example, as shown in FIG. 2, providing module 212 may provide digital response-indicator 230 to an additional user 232 of an additional user device 234.

Providing module 212 may provide digital response-indicator 230 to additional user device 234 in a variety of ways, depending on the form that digital response-indicator 230 takes. For example, in examples in which digital response-indicator 230 represents a digital sound effect, providing module 212 may provide digital response-indicator 230 by transmitting a version of digital audiobook 222 that includes digital response-indicator 230 as part of the audio file. As another example, in examples in which digital response-indicator 230 represents a visual graphic, providing module 212 may provide digital response-indicator 230 by transmitting a digitally printed version of digital audiobook 222 that includes digital response-indicator 230.

As another example, in examples in which digital response-indicator 230 represents an entry in a table, providing module 212 may provide digital response-indicator 230 by transmitting a digital version of the table. In some examples, the digital table may be provided as part of a digitally printed version of digital audiobook 222. In other examples, the digital table may be provided within an interface through which the audio version of digital audiobook 222 is accessed (e.g., an interface provided via an additional instance of audiobook application 210 and/or a browser installed on additional user device 234).

In certain embodiments, providing module 212 may provide a special author interface to a user designated as an author of digital audiobook 222. The author interface may include a summary of user responses detected for the various segments of digital audiobook 222. In some examples, this author interface may additionally facilitate interactions between listeners and/or readers of digital audiobook 222 and the author. For example, the author interface may enable the author to post public comments responding to user responses. In some examples, the author interface may additionally enable other users to digitally respond to the author's comments.

As described throughout the present disclosure, the disclosed systems and methods may provide systems and methods for digitally collecting audible responses to audiobook content and digitally enhancing the content based on the collected responses. In one example, a computer-implemented method may include (1) providing, to a user device, access to an audiobook service, (2) receiving, from the user device, data describing an audible user response to a segment of an audiobook that was transmitted to the user device from the audiobook service, (3) creating a digital response-indicator indicative of the audible user response, and (4) providing the digital response-indicator to an additional user device.

In one embodiment, the audiobook service may operate in conjunction with a social-media platform. In one embodiment, prior to receiving the data from the user device, the user device may have (1) provided the segment of the audiobook to a user of the user device by playing the segment via speakers communicatively coupled to the user device and (2) detected the audible user response via a microphone communicatively coupled to the user device.

In one embodiment, the audible user response may include a spontaneous user response. For example, the audible user response may include at least one of laughter, an exclamation, a gasp, and/or one or more words. In some examples, the audible user response may include a vocal command. For example, the audible user response may include an instruction to (1) highlight the segment, (2) bookmark the segment, and/or (3) assign an attribute to the segment.

In one embodiment, the digital response-indicator may represent a digital sound effect. In this embodiment, providing the digital response-indicator may include (1) superimposing the digital sound effect over a portion of the audiobook corresponding to the segment and (2) transmitting a version of the audiobook with the superimposed digital sound effect to the additional user device.

In some embodiments, the digital response-indicator may represent a visual graphic. In these embodiments, providing the digital response-indicator may include providing the digital response-indicator within a digitally printed version of the audiobook, in a manner that visually connects the digital response-indicator with the segment.

In one example, the digital response-indicator may represent a text-based indicator. In this example, providing the digital response-indicator may include providing the text-based indicator as an entry in a digital table that summarizes user responses to segments of the audiobook.

In one embodiment, a system for implementing the above-described method may include (1) a providing module, stored in memory, that provides, to a user device, access to an audiobook service, (2) a receiving module, stored in memory, that receives, from the user device, data describing an audible user response to a segment of an audiobook that was transmitted to the user device from the audiobook service, (3) a creation module, stored in memory, that creates a digital response-indicator indicative of the audible user response, and (4) a physical processor configured to execute the providing module, the receiving module, and the creation module. In this embodiment, the providing module may also provide the digital response-indicator to an additional user device.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) provide, to a user device, access to an audiobook service, (2) receive, from the user device, data describing an audible user response to a segment of an audiobook that was transmitted to the user device from the audiobook service, (3) create a digital response-indicator indicative of the audible user response, and (4) provide the digital response-indicator to an additional user device.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, from a user device, user response data describing a user's audible user response to a segment of an audiobook that was transmitted to the user device from an audiobook service, wherein the user response data indicates that the user laughed while the segment was played;
   creating a digital response-indicator indicative of the audible user response, wherein the digital response-indicator comprises a digital sound effect comprising a soundtrack of people laughing; and providing the digital response-indicator to an additional user device by (1) superimposing the digital sound effect over a portion of the audiobook corresponding to the segment and (2) transmitting a version of the audiobook with the superimposed digital sound effect to the additional user device.

2. The computer-implemented method of claim 1, wherein the audiobook service operates in conjunction with a social-media platform.

3. The computer-implemented method of claim 1, wherein, prior to receiving the user response data from the user device, the user device (1) provided the segment of the audiobook to a user of the user device by playing the segment via speakers communicatively coupled to the user device and (2) detected laughter via a microphone communicatively coupled to the user device.

4. The computer-implemented method of claim 1, further comprising:
  receiving, from the user device, data describing a vocal command received by the user device as an additional segment of the audiobook was played;
  creating an additional digital response-indicator indicative of the vocal command; and
  providing the additional digital response-indicator to the additional user device.

5. The computer-implemented method of claim 4, wherein the vocal command comprises an instruction to at least one of:
  highlight the segment;
  bookmark the segment; or
  assign an attribute to the segment.

6. The computer-implemented method of claim 1, wherein:
  the digital response-indicator further comprises a visual graphic; and
  providing the digital response-indicator further comprises providing the digital response-indicator within a digitally printed version of the audiobook, in a manner that visually connects the digital response-indicator with the segment.

7. The computer-implemented method of claim 1, wherein the digital response-indicator further comprises a text-based indicator.

8. The computer-implemented method of claim 7, wherein providing the digital response-indicator further comprises providing the text-based indicator as an entry in a digital table that summarizes user responses to segments of the audiobook.

9. The computer-implemented method of claim 8, wherein the entry comprises an entry of at least one of:
  one or more segments of the audiobook that were laughed at; or
  one or more segments of the audiobook that were most laughed at.

10. The computer-implemented method of claim 9, wherein the digital table further comprises an entry of one or more segments that were expressly categorized by users.

11. The computer-implemented method of claim 9, wherein the digital table further comprises at least one of:
  an entry of one or more most highlighted segments; or
  an entry of one or more most bookmarked segments.

12. The computer-implemented method of claim 9, wherein the digital table further comprises at least one of:
  an entry of one or more segments that were most often shared; or
  an entry of one or more most listened to segments.

13. A system comprising:
  a receiving module, stored in memory, that receives, from a user device, user response data describing a user's audible user response to a segment of an audiobook that was transmitted to the user device from an audiobook service, wherein the user response data indicates that the user laughed while the segment was played;
  a creation module, stored in memory, that creates a digital response-indicator indicative of the audible user response, wherein the digital response-indicator comprises a digital sound effect comprising a soundtrack of people laughing; and
  a providing module, stored in memory, that provides the digital response-indicator to an additional user device by (1) superimposing the digital sound effect over a portion of the audiobook corresponding to the segment and (2) transmitting a version of the audiobook with the superimposed digital sound effect to the additional user device; and
  at least one physical processor configured to execute the receiving module, the creation module, and the providing module.

14. The system of claim 13, wherein the audiobook service operates in conjunction with a social-media platform.

15. The system of claim 13, wherein, prior to the receiving module receiving the user response data from the user device, the user device (1) provided the segment of the audiobook to a user of the user device by playing the segment via speakers communicatively coupled to the user device and (2) detected laughter via a microphone communicatively coupled to the user device.

16. The system of claim 13, wherein the digital response-indicator further comprises a text-based indicator.

17. The system of claim 16, wherein providing the digital response-indicator further comprises providing the text-based indicator as an entry in a digital table that summarizes user responses to segments of the audiobook.

18. The system of claim 17, wherein the entry comprises an entry of at least one of:
  one or more segments of the audiobook that were laughed at; or
  one or more segments of the audiobook that were most laughed at.

19. The system of claim 18, wherein the digital table further comprises at least one of:
  an entry of one or more segments that were expressly categorized by users;
  an entry of one or more most highlighted segments;
  an entry of one or more most bookmarked segments;
  an entry of one or more segments that were most often shared; or
  an entry of one or more most listened to segments.

20. A non-transitory computer-readable medium comprising one or more computer-readable instructions that, when executed by at least one processor of a computing device, cause the computing device to:
  receive, from a user device, user response data describing a user's audible user response to a segment of an audiobook that was transmitted to the user device from an audiobook service, wherein the user response data indicates that the user laughed while the segment was played;
  create a digital response-indicator indicative of the audible user response, wherein the digital response-indicator comprises a digital sound effect comprising a soundtrack of people laughing; and provide the digital response-indicator to an additional user device by (1) superimposing the digital sound effect over a portion of the audiobook corresponding to the segment and (2) transmitting a version of the audiobook with the superimposed digital sound effect to the additional user device.

* * * * *